US011022809B1

(12) United States Patent
Richards et al.

(10) Patent No.: US 11,022,809 B1
(45) Date of Patent: Jun. 1, 2021

(54) DISPLAY DEVICES WITH WAVELENGTH-DEPENDENT REFLECTORS FOR EYE TRACKING

(71) Applicant: Facebook Technologies, LLC, Menlo Park, CA (US)

(72) Inventors: Evan Mark Richards, Fremont, CA (US); Cina Hazegh, Walnut Creek, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/785,249

(22) Filed: Feb. 7, 2020

Related U.S. Application Data

(60) Provisional application No. 62/804,179, filed on Feb. 11, 2019.

(51) Int. Cl.
*G02B 27/01* (2006.01)
*G06F 3/01* (2006.01)

(52) U.S. Cl.
CPC ..... *G02B 27/0179* (2013.01); *G02B 27/0172* (2013.01); *G06F 3/013* (2013.01); *G02B 2027/0187* (2013.01)

(58) Field of Classification Search
CPC ......... G06F 3/012; G06F 3/013; G02B 27/01; G02B 27/0172; G02B 27/0179; G02B 27/0977; G02B 27/0988; G02B 27/141; G02B 27/148; G02B 2027/0187
See application file for complete search history.

(56) References Cited

U.S. PATENT DOCUMENTS

| 6,097,353 A * | 8/2000 | Melville ............... G02B 27/01 345/8 |
| 9,791,924 B2 * | 10/2017 | Shiu ...................... G06F 1/163 |
| 10,429,656 B1 * | 10/2019 | Sharma ............. G02B 27/0172 |
| 10,598,928 B1 * | 3/2020 | Lam .................... G02B 27/0172 |
| 10,634,907 B1 * | 4/2020 | Geng .................... G02B 27/283 |
| 10,877,556 B2 * | 12/2020 | Berkner-Cieslicki ....................... G02B 27/0172 |
| 2015/0378161 A1 * | 12/2015 | Bailey ................... G02B 27/30 345/8 |
| 2018/0068449 A1 * | 3/2018 | Malaika ............. G06K 9/00604 |
| 2019/0050051 A1 * | 2/2019 | Cirucci ............. G02B 27/0172 |
| 2019/0101757 A1 * | 4/2019 | Martinez ................. G06F 3/013 |
| 2020/0125169 A1 * | 4/2020 | Chappell ................... G06T 7/70 |

* cited by examiner

*Primary Examiner* — Mihir K Rayan
(74) *Attorney, Agent, or Firm* — Morgan, Lewis & Bockius LLP

(57) ABSTRACT

A head-mounted display device includes one or more infrared light sources configured to emit infrared light toward one or more eyes of a wearer, a first mirror configured to transmit the infrared light reflected from the one or more eyes of the wearer toward the first mirror, that reaches the first mirror at a first incident angle, the second mirror configured to reflect the infrared light transmitted through the first mirror, toward the first mirror so that the first mirror is configured to reflect the infrared light reflected by the second mirror, and incident on the first mirror at a second incident angle that is greater than the first incident angle, one or more sensors configured to detect the infrared light reflected by the first mirror and the second mirror for determining a gaze direction of the one or more eyes of the wearer.

20 Claims, 10 Drawing Sheets

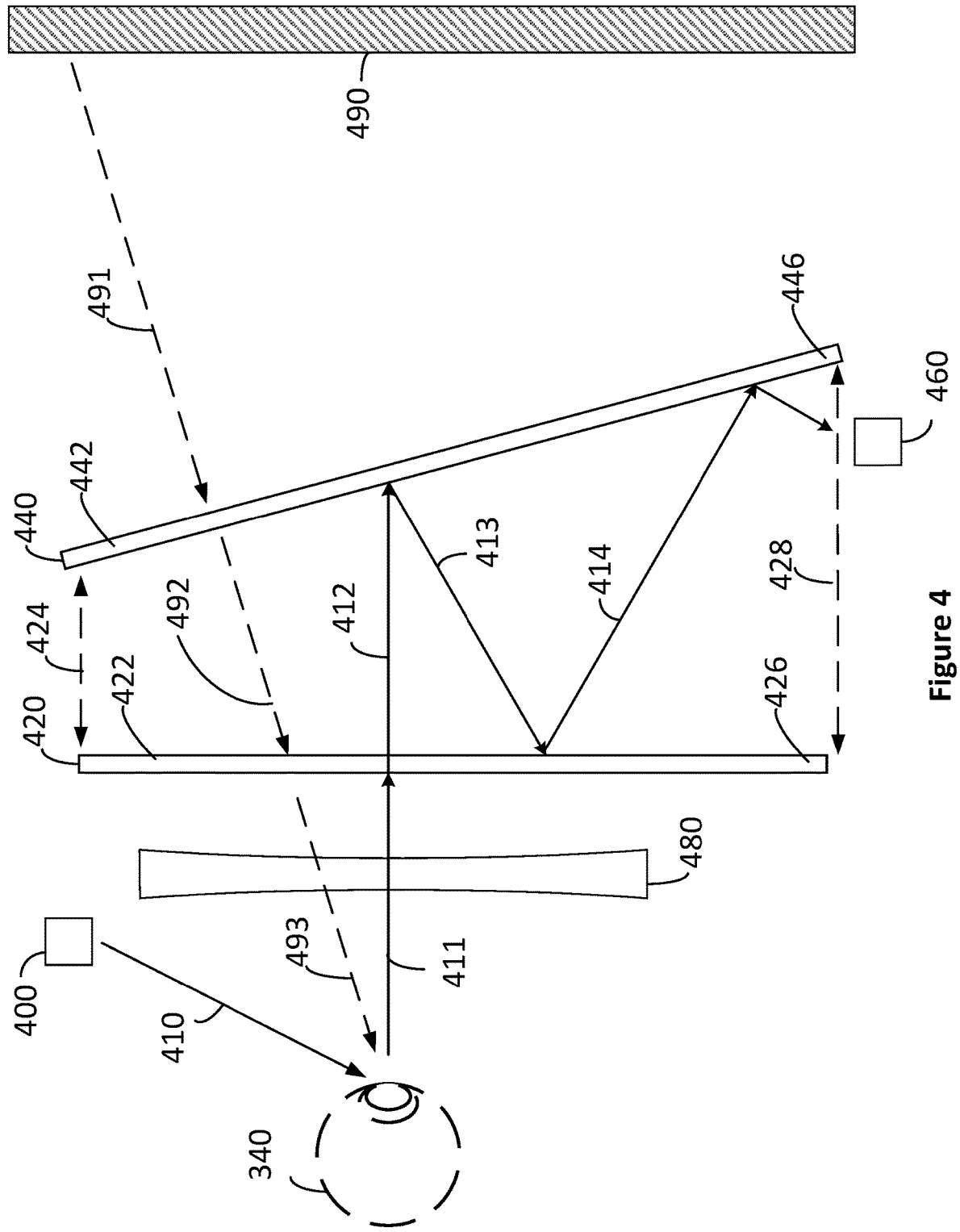

900

---

902 Emit infrared light from one or more infrared light sources toward one or more eyes of a wearer.

↓

904 Transmit an infrared light, reflected from the one or more eyes of the wearer toward a first mirror and received by the first mirror at a first incident angle, through the first mirror and reflect an infrared light, reflected from the one or more eyes of the wearer toward the first mirror and received by the first mirror at a second incident angle. The second incident angle is greater than the first incident angle.

↓

906 Reflect the infrared light transmitted through the first mirror, by a second mirror that is inclined at a first incline angle from an optical axis of one or more lenses coupled with one or more displays of a head-mounted display device, at a first reflection angle.

↓

908 Reflect the infrared light, reflected by the second mirror toward the first mirror, by the first mirror at a second reflection angle that is greater than the first reflection angle.

↓

910 Detect with one or more sensors, the infrared light reflected by the first mirror and the second mirror for determining a gaze direction of the one or more eyes of the wearer.

Figure 9

DISPLAY DEVICES WITH WAVELENGTH-DEPENDENT REFLECTORS FOR EYE TRACKING

This application claims the benefit of, and priority to, U.S. Provisional Patent Application No. 62/804,179, filed Feb. 11, 2019, which is incorporated by reference herein in its entirety.

TECHNICAL FIELD

This relates generally to head-mounted display devices, and more specifically to optical components used in head-mounted display devices.

BACKGROUND

Head-mounted display devices (also called herein head-mounted displays) are gaining popularity as a means for providing visual information to users. Some head-mounted display devices are provided with at least one mirror and eye tracking sensor for updating visual information based on information from the eye tracking sensor.

However, in conventional head-mounted display devices, eye tracking configurations have a complex and long optical track path from a wearer's eyes to the eye tracking sensor(s) due to the limited space available in conventional head-mounted display devices. Such configurations have limited the accuracy in determining gaze directions of the eyes of the wearer.

SUMMARY

Accordingly, there is a need for head-mounted display devices with enhanced accuracy in eye tracking. In addition, such head-mounted display devices need to be compact so as to improve user satisfaction with such devices.

The above deficiencies and other problems are reduced or eliminated by the disclosed devices, systems, and methods.

In accordance with some embodiments, a head-mounted display device includes one or more infrared light sources configured to emit infrared light toward one or more eyes of a wearer, a first mirror configured to transmit an infrared light, reflected from the one or more eyes of the wearer toward the first mirror and received by the first mirror at a first incident angle, the first mirror configured to reflect an infrared light, reflected from the one or more eyes of the wearer toward the first mirror and received by the first mirror at a second incident angle that is greater than the first incident angle, a second mirror coupled with the first mirror, the second mirror configured to reflect the infrared light transmitted through the first mirror toward the first mirror, one or more displays configured to provide visible light toward the second mirror. The second mirror and the first mirror are configured to transmit the visible light from the one or more displays. The head-mounted display device further includes one or more lenses configured to transmit the visible light from the one or more displays toward the one or more eyes of the wearer and one or more sensors configured to detect the infrared light reflected by the first mirror and the second mirror for determining a gaze direction of the one or more eyes of the wearer. The second mirror is inclined at a first incline angle from an optical axis of the one or more lenses so that the infrared light transmitted through the first mirror is reflected by the second mirror toward the first mirror at a first reflection angle, and the infrared light reflected by the second mirror is reflected by the first mirror toward the second mirror at a second reflection angle that is greater than the first reflection angle.

In accordance with some embodiments, a method for providing content to a wearer of a head-mounted display device includes emitting infrared light from one or more infrared light sources toward one or more eyes of a wearer, transmitting an infrared light, reflected from the one or more eyes of the wearer toward a first mirror and received by the first mirror at a first incident angle, through the first mirror and reflecting an infrared light, reflected from the one or more eyes of the wearer toward the first mirror and received by the first mirror at a second incident angle. The second incident angle is greater than the first incident angle. The method further includes reflecting the infrared light transmitted through the first mirror, with a second mirror that is inclined at a first incline angle from an optical axis of one or more lenses coupled with one or more displays of the head-mounted display device, at a first reflection angle, reflecting the infrared light, reflected by the second mirror toward the first mirror, with the first mirror at a second reflection angle that is greater than the first reflection angle, and detecting, with one or more sensors, the infrared light reflected by the first mirror and the second mirror for determining a gaze direction of the one or more eyes of the wearer.

Thus, the disclosed embodiments provide devices and methods that provide enhanced accuracy in eye tracking in a compact head-mounted display device configuration.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a schematic diagram illustrating a head-mounted display device in accordance with some embodiments.

FIG. 9 is a flow diagram illustrating a method of making a display device in accordance with some embodiments.

Figure 1:
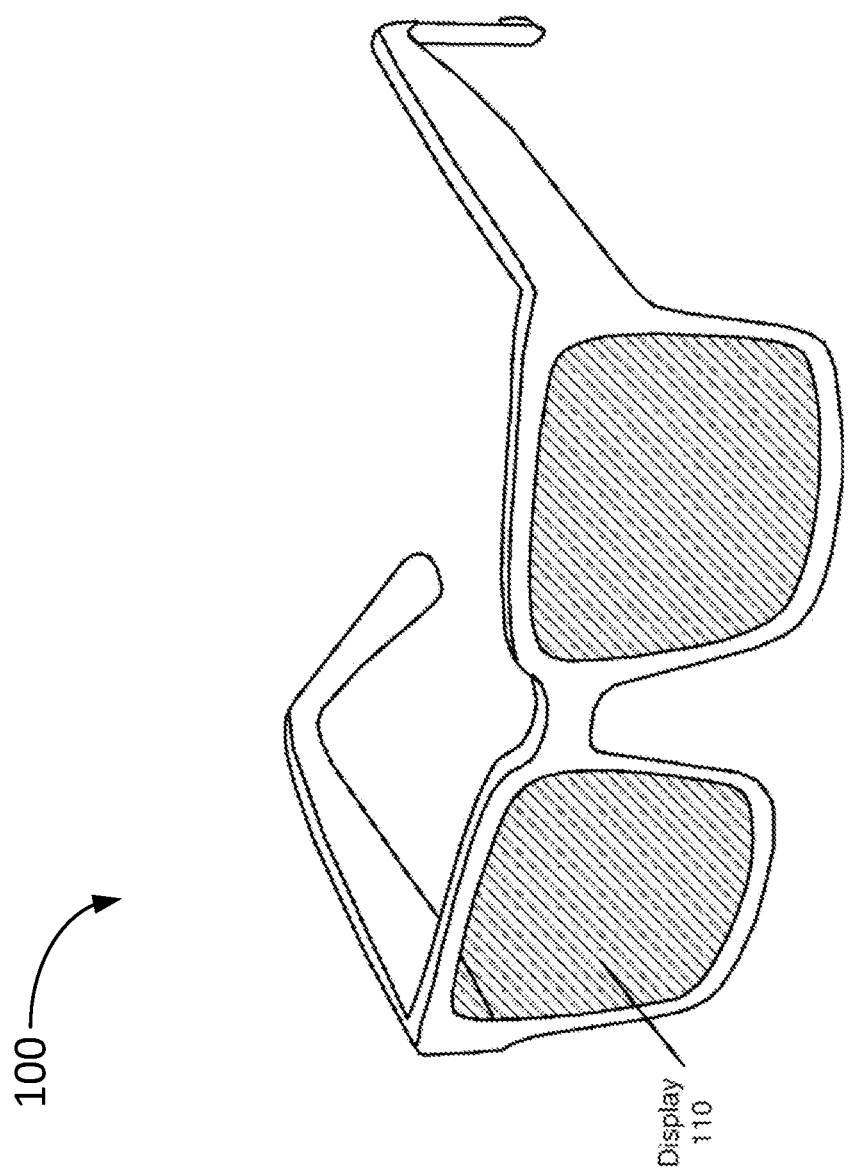
FIG. 1 is a perspective view of a display device in accordance with some embodiments.

These figures are not drawn to scale unless indicated otherwise.

DETAILED DESCRIPTION

In conventional head-mounted display devices, eye tracking operations are done by placing at least one mirror that is configured to reflect infrared light reflected from the eyes of a wearer along an eye track path toward eye tracking sensors. However, due to the limited space available in the conventional head-mounted display devices, such eye tracking configuration has a long and complex eye track path. Additionally, such configurations have limited accuracy in determining the gaze directions of the eyes of the wearer and need more space in conventional head-mounted display devices.

Herein, a pair of mirrors for two or more reflections of infrared light reflected from the eyes of the wearer can be used. In some embodiments, the pair of mirrors are placed at a particular angle to each other. In some embodiments, a first mirror, that is placed close to the eyes of the wearer, is configured to transmit infrared light based on an incident angle of the infrared light incident on the first mirror so that infrared light reflected from the eyes of a wearer is transmitted through the first mirror. In some embodiments, a second mirror, that is placed away from the eyes of the wearer, is inclined at a particular incident angle from an optical axis of one or more lenses of a head-mounted display device so that the second mirror is able to reflect infrared light transmitted through the first mirror, toward the first mirror. In some embodiments, the first mirror is configured to reflect the infrared light reflected by the second mirror based on an incident angle of the infrared light incident on the first mirror. In this way, two or more reflections of the infrared light continue in the pair of mirrors until the eye tracking sensors detect the infrared light reflected by either the first mirror or the second mirror. By placing the pair of mirrors with such a particular angle, this configuration allows more space to be available for other components (e.g., varifocal actuation components, inside out cameras, etc.) in the head-mounted display device and provides a shorter eye track length so as to improve accuracy in eye tracking operations.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first region could be termed a second region, and, similarly, a second region could be termed a first region, without departing from the scope of the various described embodiments. The first region and the second region are both regions, but they are not the same region.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Embodiments described herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 illustrates display device 100 in accordance with some embodiments. In some embodiments, display device 100 is configured to be worn on the head of a user (e.g., by having the form of spectacles or eyeglasses, as shown in FIG. 1) or to be included as part of a helmet that is to be worn by the user. When display device 100 is configured to be worn on a head of a user or to be included as part of a helmet or headset, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual content (e.g., augmented reality content, virtual reality content, mixed reality content, or any combination thereof) to a user.

In some embodiments, display device 100 includes one or more components described below with respect to FIG. 2. In some embodiments, display device 100 includes additional components not shown in FIG. 2.

Figure 2:
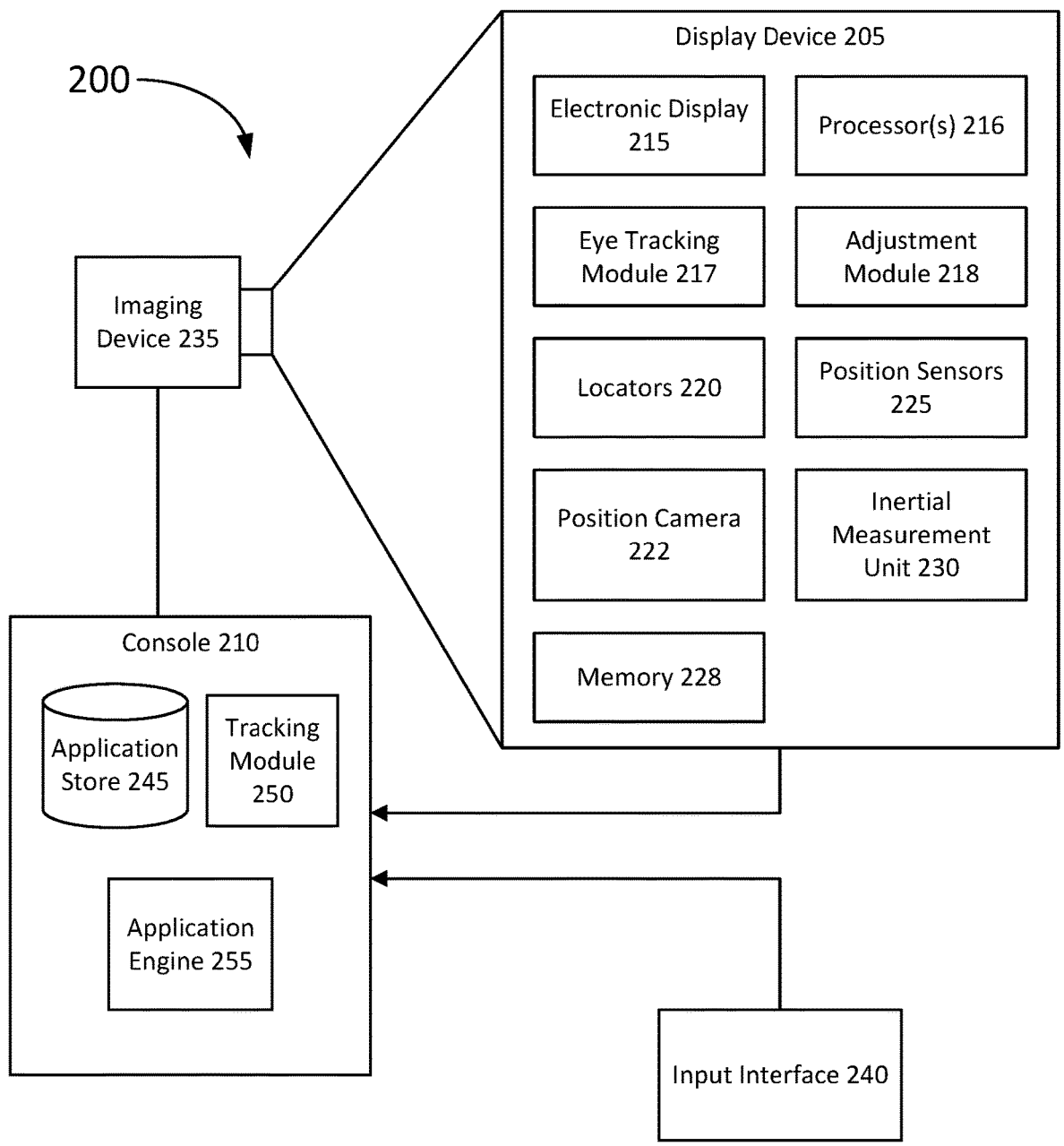
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having an associated input interface 240 and being monitored by one or more imaging devices 235, with each display device 205, input interface 240, and imaging device 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and/or augmented reality.

In some embodiments, as shown in FIG. 1, display device 205 is a head-mounted display that presents media to a user. Examples of media presented by display device 205 include one or more images, video, audio, haptics, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 can augment views of a physical, real-world environment with computer-generated elements (e.g., images, video, sound, haptics, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximite to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display such that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is optionally configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
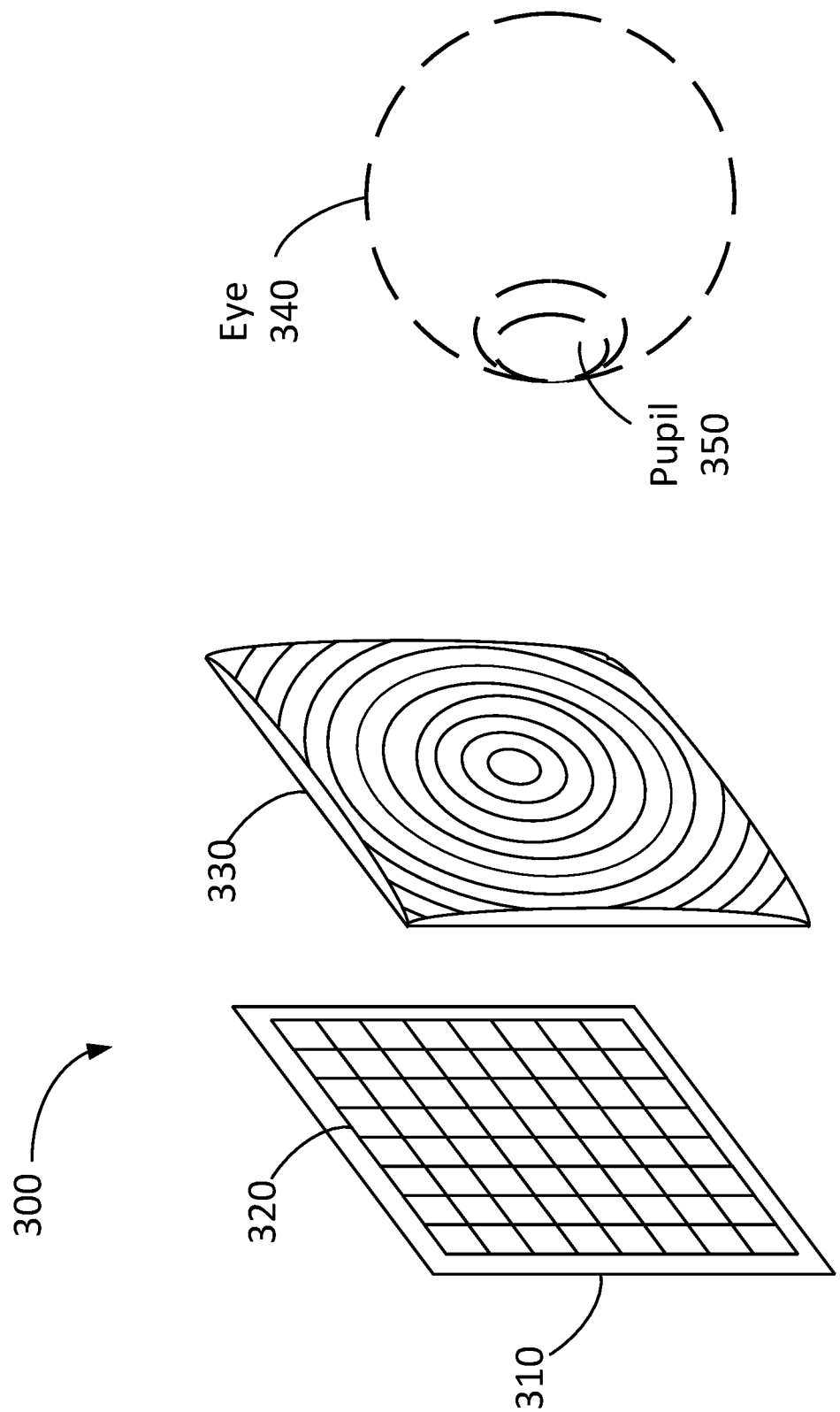
FIG. 3 is an isometric view of a display device in accordance with some embodiments.

FIG. 3 is an isometric view of display device 300 in accordance with some embodiments. In some other embodiments, display device 300 is part of some other electronic display (e.g., digital microscope, etc.). In some embodiments, display device 300 includes light emission device array 310 and one or more lenses 330. In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR). In some embodiments, a microLED includes an LED with an emission area characterized by a representative dimension (e.g., a diameter, a width, a height, etc.) of 100 μm or less (e.g., 50 μm, 20 μm, etc.). In some embodiments, a microLED has an emission area having a shape of a circle or a rectangle.

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses 330. In some embodiments, display device 300 uses the emission intensity array to facilitate providing image light to a location of pupil 350 of eye 340 of a user, and minimize the amount of image light provided to other areas in the eyebox.

One or more lenses 330 receive the modified image light (e.g., attenuated light) from the emission intensity array (or directly from emission device array 310), and shifted by one or more beam shifters 360, and direct the shifted image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

FIG. 4 is a schematic diagram illustrating a head-mounted display device in accordance with some embodiments.

In some embodiments, the head-mounted display device includes one or more infrared light sources 400, a first mirror 420, a second mirror 440, one or more sensors 460, one or more lenses 480 and one or more displays 490. For illustration purposes, one or more eyes of a wearer are illustrated as a single eye 340 in FIG. 4. In some embodiments, the one or more infrared light sources 400, the first mirror 420, the second mirror 440, and the one or more sensors 460 are used for more accurate eye tracking.

For illustration purposes, the one or more infrared light sources 400 are illustrated as a single box in FIG. 4. However, the one or more infrared light sources 400 need not be contiguous (e.g., in some cases, the one or more light sources 400 include a first infrared light source and a second infrared light source that is distinct and separate from the first infrared light source). In some embodiments, the one or more infrared light sources 400 include a plurality of light sources for projecting a pattern of infrared light over a particular area of the eye 340. In some embodiments, the one or more infrared light sources 400 are configured to emit infrared light 410 toward the eye 340. The infrared light 411 is reflected from the eye 340 toward the one or more lenses 480.

For illustration purposes, the one or more lenses 480 are illustrated as a single lens in FIG. 4. However, the one or more lenses 480 include at least one convex lens, at least one concave lens, at least convex-concave lens, or any combination thereof. In some embodiments, the one or more lenses 480, as illustrated in FIG. 4, are located in front of the first mirror 420 to transmit the infrared light 411 reflected from the eye 340 toward the first mirror 420. In some embodiments, the one or more lenses 480 are located in front of the one or more displays 490 to transmit visible light 491 projected from the one or more displays 490 toward the second mirror 440.

In some embodiments, the first mirror 420 is a hot mirror having a spectrally dependent coating on a surface of the first mirror 420 facing toward the second mirror 440 so that the first mirror 420 is configured to transmit visible light (e.g., light having a wavelength within 380-780 nm) that is transmitted toward the first mirror 420, toward the second mirror 440 and reflect infrared light (e.g., light having a wavelength within 781-1000 nm) that is transmitted toward the first mirror 420. For example, the first mirror 420 is configured to transmit the visible light regardless of an incident angle of the light so that the first mirror 420 allows all visible light transmitted toward the first mirror 420 to pass through the first mirror 420. In some embodiments, the first mirror 420 is configured to transmit infrared light received by the first mirror 420 at an incident angle that is not within a particular incident angle range (e.g., 22.5°-90°). For example, the first mirror 420 is configured to transmit infrared light incident on the first mirror 420 at an incident angle that is less than a minimum angle (e.g., 22.5°) of the particular incident angle range. In some embodiments, the first mirror 420 is configured to reflect infrared light incident on the first mirror 420 at an incident angle that is greater than, or equal to the minimum incident angle (e.g., 22.5°) and less than 90°. As shown in FIG. 4, infrared light 412 is incident on the first mirror 420 at a first incident angle (e.g., 0 (zero)°) that is less than the minimum incident angle, so that the first mirror 420 transmits infrared light 412 toward the second mirror 440.

Although the infrared light 411 is illustrated as a single arrow in FIG. 4, the infrared light 411 is reflected from the eye 340 toward the first mirror 420 in all directions. Thus, a plurality of rays of infrared light 411 (or a plurality of infrared light) reflected from the eye 340 simultaneously reaches the first mirror 420 at different incident angles. In some embodiments, the first mirror 420 is configured to transmit a first infrared light (or a first ray) of the infrared light 411 incident on the first mirror 420 at a first incident angle, that is less than the minimum angle (e.g., 22.5°) of the particular incident angle range, and reflect a second infrared light (or a second ray) of the infrared light 411 incident on the first mirror 420 at a second incident angle that is within the particular incident angle range. In some embodiments, the second incident angle is greater than the first incident angle.

The second mirror 440 coupled with the first mirror 420 is configured to reflect the infrared light 413 transmitted through the first mirror 420, back toward the first mirror 420. In some embodiments, the second mirror 440 is a hot mirror having a spectrally dependent coating on a surface of the second mirror 440 facing toward the first mirror 420. In some embodiments, the second mirror 440 is configured to transmit visible light transmitted toward the second mirror 440 regardless of an incident angle of the visible light and to reflect infrared light transmitted toward the second mirror 440 regardless of the incident angle of the infrared light incident on the second mirror 440. In some embodiments, the second mirror 440 is inclined at a particular incline angle (e.g., 5°, 10°, 15°, 22.5°, 45°, etc.) from an optical axis of the one or more lenses 480 so that the infrared light 412 transmitted through the first mirror 420 reaches the second mirror 440 at a third incident angle. In some embodiments, the incline angle is not fixed and changeable. In some embodiments, the third incident angle is dependent on the particular incline angle of the second mirror 440. In some embodiments, the third incident angle is greater than the first incident angle, and the second incident angle. Due to the incline angle, a first end 422 of the first mirror 420 (e.g., a top portion of the first mirror 420) has a first distance 424 to a first end 442 of the second mirror 440 (e.g., a top portion of the second mirror 440) that is adjacent to the first end 422 of the first mirror 420 and a second end 426 of the first mirror 420 (e.g., a bottom portion of the first mirror 420), opposite to the first end 422 of the first mirror 420, has a second distance 428 to a second end 446 of the second mirror 440 (e.g., a bottom portion of the second mirror 440) that is opposite to the first end 442 of the second mirror 440 and is adjacent to the second end 426 of the first mirror 420 so that the reflected infrared light (e.g., the infrared light 413, the infrared light 414) is directed toward a region that includes the second end 446 of the second mirror 440 and the second end 426 of the first mirror 420 and away from a region that includes the first end 442 of the second mirror 440 and the first end 422 of the first mirror 420. In some embodiments, the first distance 424 between the first end 422 of the first mirror 420 and the first end 442 of the second mirror 440 is less than the second distance 428 between the second end 426 of the first mirror 420 and the second end 446 of the second mirror 440. The second mirror 440 is configured to reflect the infrared light 413 at a first reflection angle, which is equal to the third incident angle, toward the first mirror 420. The first mirror 420 receives the infrared light 413 reflected by the second mirror 440 at a fourth incident angle, which is not within the particular incident angle range, so that the first mirror 420 reflects the infrared light 414 at a second reflection angle, that is equal to the fourth incident angle, toward the second mirror 440. In some embodiments, the second reflection angle is greater than the first reflection angle. In some embodiments, the fourth incident angle is greater than the first incident angle, the second incident angle, and the third incident angle. As two or more reflections of the infrared light continue in the first mirror 420 and the second mirror 440, the incident angle of the infrared light increases (e.g., the fourth incident angle is two times greater than the third incident angle). In some embodiments, two or more reflections of the infrared light continue until the one or more sensors 460 detect the infrared light reflected by the first mirror 420 and the second mirror 440. Although FIG. 4 illustrates that the one or more sensors 460 detect the infrared light reflected by the second mirror 440, the one or more sensors 460 can detect infrared light reflected by either the first mirror 420 or the second mirror 440.

The one or more sensors 460 are configured to detect the infrared light reflected by the first mirror 420 and the second mirror 440 for determining a gaze direction of the eye 340 (e.g., based on the intensity of the infrared light received by the one or more sensors 460, it is determined whether the infrared light is reflected by the retina, iris, or sclera of the eye 340). For illustration purposes, the one or more sensors 460 are shown as a single block in FIG. 4. However, the one or more sensors 460 need not be contiguous (e.g., in some cases, the one or more sensors 460 include a first sensor and a second sensor that is distinct and separate from the first sensor). In some embodiments, the one or more sensors 460 are located adjacent to the region that includes the second end 446 of the second mirror 440 and the second end 426 of the first mirror 420 for detecting the infrared light reflected by the first mirror 420 and the second mirror 440. In some embodiments, the one or more sensors 460 operate eye tracking operations as described above with respect to the eye tracking module 217. In some embodiments, the one or more sensors 460 include an array of multiple sensors (e.g., a two-dimensional array of sensors) for receiving infrared light reflected from a particular area of the eye 340.

The one or more displays 490 are configured to provide visible light 491 toward the second mirror 440. For illustration purposes, the one or more displays 490 are illustrated as a single box, and the one or more displays 490 need not be contiguous. In some embodiments, the one or more displays 490 include two separate displays (e.g., a first display for a left eye and a second display for a right eye). In some embodiments, the one or more displays 490 include three or more displays (e.g., three or more distinct and separate displays, such as four distinct and separate displays that are stitched together to operate as a display element for the head-mounted display device). In some embodiments, the one or more displays 490 include only a single contiguous display (e.g., the single contiguous display projects light for both left and right eyes). In some embodiments, the second mirror 440 is configured to transmit the visible light 492 from the one or more displays 490 toward the first mirror 420, and the first mirror 420 is configured to transmit the visible light 493 toward the one or more lenses 480. Then the one or more lenses 480 are configured to transmit the visible light transmitted through the second mirror 440 and the first mirror 420 toward the eye 340. As described above, the second mirror 440 is inclined at the particular incline angle from the optical axis of the one or more lenses 480 so that the head-mounted display device has available space between the second mirror 440 and the one or more display panels 490. In some embodiments, the one or more lenses 480 are located between the second mirror 440 and the one or more display panels 490.

Figure 5A:
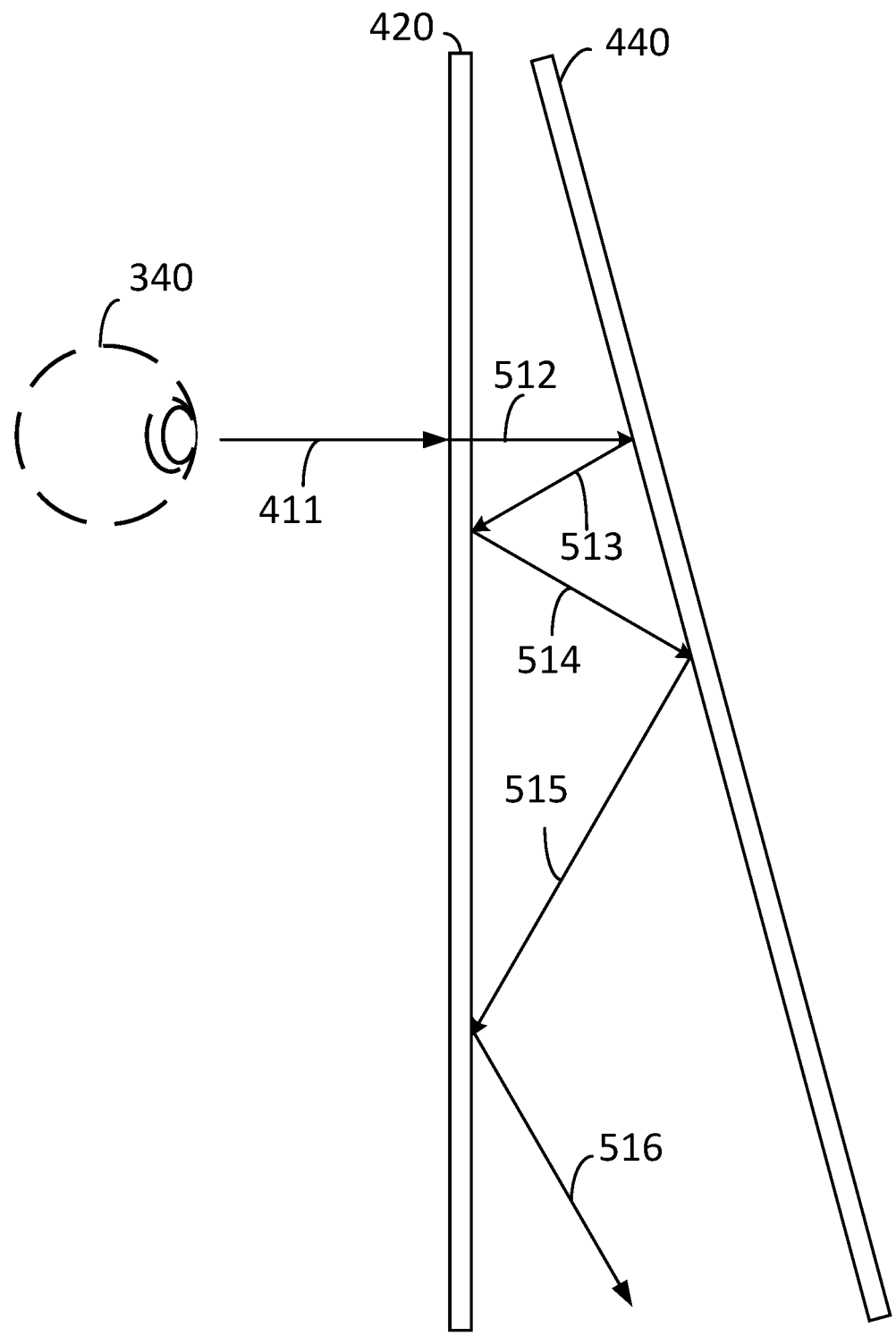
FIG. 5A illustrates two or more reflections of infrared light reflected from the eye 340 between the first mirror 420 and the second mirror 440 in accordance with some embodiments.

FIG. 5A illustrates two or more reflections of infrared light reflected from the eye 340 between the first mirror 420 and the second mirror 440 in accordance with some embodiments.

For illustration purposes, FIG. 5A illustrates only the eye 340, the first mirror 420, and the second mirror 440 of the head-mounted display device as described above with respect to FIG. 4. For brevity, the detailed descriptions of components of the head-mounted display device as described with respect to FIG. 4 are not repeated herein. As described above, the infrared light 411 is reflected from the eye 340 toward the first mirror 420. In some embodiments, the first mirror 420 is configured to transmit infrared light received at an incident angle that is not within a particular incident angle range (e.g., 22.5°-90°) that allows the first mirror 420 to reflect the received infrared light. In some embodiments, the first mirror 420 is configured to reflect infrared light received at an incident angle that is greater than, or equal to a minimum incident angle (e.g., 22.5°) of the particular incident angle range (e.g., 22.5°-90°). In FIG. 5A, the infrared light 411 reaches the first mirror 420 at a first incident angle (e.g., 0 (zero) °), that is not within the particular incident angle range, so that the first mirror 420 transmits the infrared light 512 toward the second mirror 440. In some embodiments, the second mirror 440 is inclined at a particular incline angle (e.g., 15°) from an optical axis of one or more lenses (e.g., the one or more lenses 480) of the head-mounted display device. As described above with respect to FIG. 4, due to the particular incline angle of the second mirror 440, the infrared light 512 transmitted through the first mirror 420 reaches the second mirror 440 at a second incident angle (e.g., 15°) that is equal to the particular incline angle of the second mirror 440. In some embodiments, the second incident angle is greater than the first incident angle. In some embodiments, the second mirror 440 is configured to reflect the infrared light 513 at a first reflection angle (e.g., 15°) toward the first mirror 420. In some embodiments, the infrared light 513 reaches the first mirror 420 at a third incident angle (e.g., 30°) that is greater than the first incident angle and the second incident angle. The third incident angle is greater than the minimum incident angle (e.g., 22.5°) of the particular incident angle range (e.g., 22.5°-90°) so that the first mirror 420 reflects the infrared light 514 toward the second mirror 440 at a second reflection angle (e.g., 30°). The second reflection angle is greater than the first reflection angle. The infrared light 514 reaches the second mirror 440 at a fourth incident angle (e.g., 45°), which is greater than the first incident angle, the second incident angle, and the third incident angle. In some embodiments, the second mirror 440 reflects infrared light 515 at a third reflection angle (e.g., 45°) which is greater than the first reflection angle and the second reflection angle. In some embodiments, the infrared light 515 reaches the first mirror 420 at a fifth incident angle (e.g., 60°), that is greater than the minimum incident angle (e.g., 22.5°) of the particular incident angle range (e.g., 22.5°-90°), so that the first mirror 420 reflects the infrared light 516. In some embodiments, the fifth incident angle is greater than the first incident angle, the second incident angle, the third incident angle and the fourth incident angle. As the two or more reflections of the infrared light in the first mirror 420 and the second mirror 440 continue, an incident angle of infrared light incident on a respective mirror (e.g., the increases. As described above, one or more sensors (the one or more sensors 460) are configured to detect the infrared light reflected by either the first mirror 420 or the second mirror 440.

Figure 5B:
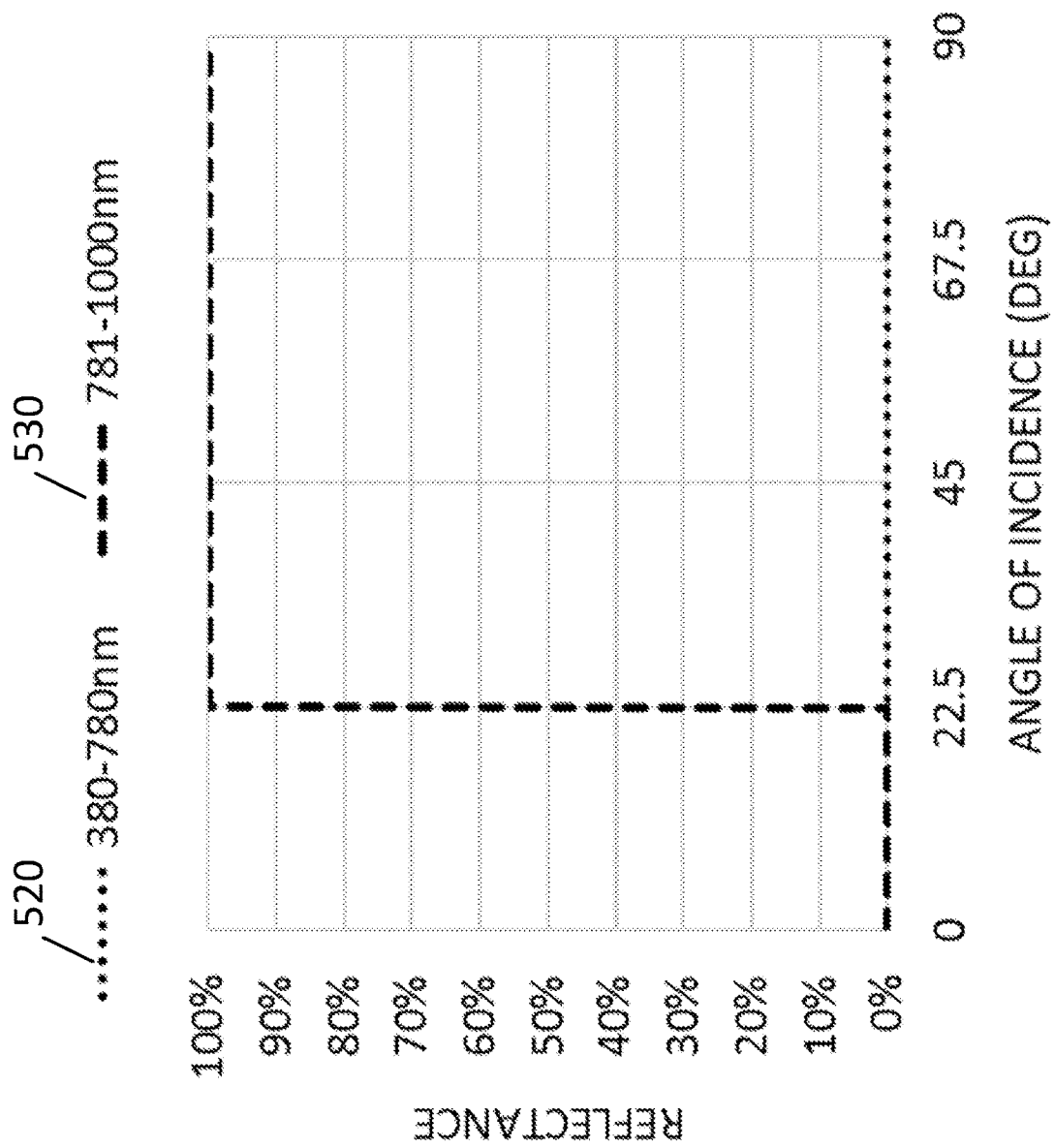
FIG. 5B is a chart that shows the reflectance of visible light and infrared light based on an incident angle that the visible light and infrared light are incident on the first mirror 420 in accordance with some embodiments.

FIG. 5B is a chart that shows the reflectance of visible light and infrared light based on an incident angle that the visible light and infrared light are incident on the first mirror 420 in accordance with some embodiments.

The horizontal axis of the chart indicates an incident angle of visible light and infrared light that reach the first mirror 420. The vertical axis of the chart indicates the reflectance of visible light and infrared light that are incident on the first mirror 420 at a respective incident angle. The reflectance indicating the amount of light reflected by the first mirror 420 has a value from 0% to 100%. A first line 520 indicates the reflectance of visible light (e.g., light having wavelengths from 380 nm to 780 nm) and a second line 530 indicates the reflectance of infrared light (e.g., light having wavelengths from 781 nm to 1000 nm) as the angle of incidence of the visible light and infrared light varies. As described above with respect to FIG. 4, the first mirror 420 is configured to transmit the visible light regardless of the incident angle, so that the first line 520 constantly indicates 0% of reflectance of infrared light at any incident angle. As described above with respect to FIG. 4, the first mirror 420 is configured to transmit the infrared light received by the first mirror 420 at an incident angle (e.g., 0° (zero), 15°, 20°, 22.4°, etc.) that is less than a minimum incident angle (e.g., 22.5°) of a particular incident angle range (e.g., 22.5°-90°) and reflect the infrared light received by the first mirror at an incident angle that is greater than or equal to the minimum incident angle (e.g., 22.5°) of the particular incident angle range (e.g., 22.5°-90°), and less than or equal to a maximum incident angle (e.g., 90°) of the particular incident angle range (e.g., 22.5°-90°). As shown in FIG. 5, the infrared light reaches the first mirror 420 at an incident angle that is greater than or equal to 0° and less than 22.4°, so that the second line 530 indicates 0% of reflectance of infrared light at any incident angle between 0° and 22.4°. In some embodiments, the second line 530 indicates that the reflectance of infrared light is 100% at 22.5°. In some embodiments, the second line 530 indicates that the reflectance of infrared light is 100% at any incident angle between 22.5° and 90°.

In conventional head-mounted display devices, a first mirror (e.g., the first mirror 420) is configured to reflect infrared light which is incident on the first mirror at a relatively greater minimum incident angle (e.g., 45°) than the minimum incident angle (e.g., 22.5°) as described above with respect to FIGS. 5A-5B, to obtain a larger field of view for one or more sensors (the one or more sensors 460). In order to obtain additional space in the head-mounted display devices, a second mirror (e.g., the second mirror 440) is inclined at an incline angle (e.g., 15°) from an optical axis of one or more lenses (e.g., the one or more lenses 480), which is relatively less than the minimum incident angle of the first mirror. As described above, infrared light (e.g., the infrared light 512) is incident on the first mirror at a first incident angle that is less than the relatively greater minimum incident angle (e.g., 45°), the infrared light passes through the first mirror toward the second mirror. In some embodiments, the infrared light transmitted through the first mirror reaches the second mirror at a second incident angle (e.g., 15°), that is equal to the incline angle of the second mirror, the second mirror reflects the infrared light (e.g., the infrared light 513) at a reflection angle (e.g., 15°), which is equal to the incident angle, toward the first mirror. In some embodiments, the infrared light (the infrared light 513) reflected from the second mirror reaches the first mirror 420 at a third incident angle (e.g., 30°), which is less than the minimum incident angle of the first mirror (e.g., 45°), so that the first mirror allows the infrared light to pass through the first mirror before one or more sensors (the one or more sensors 460) detect the infrared light. In order to prevent the infrared light from passing through the first mirror, polarization can be used.

Figure 6:
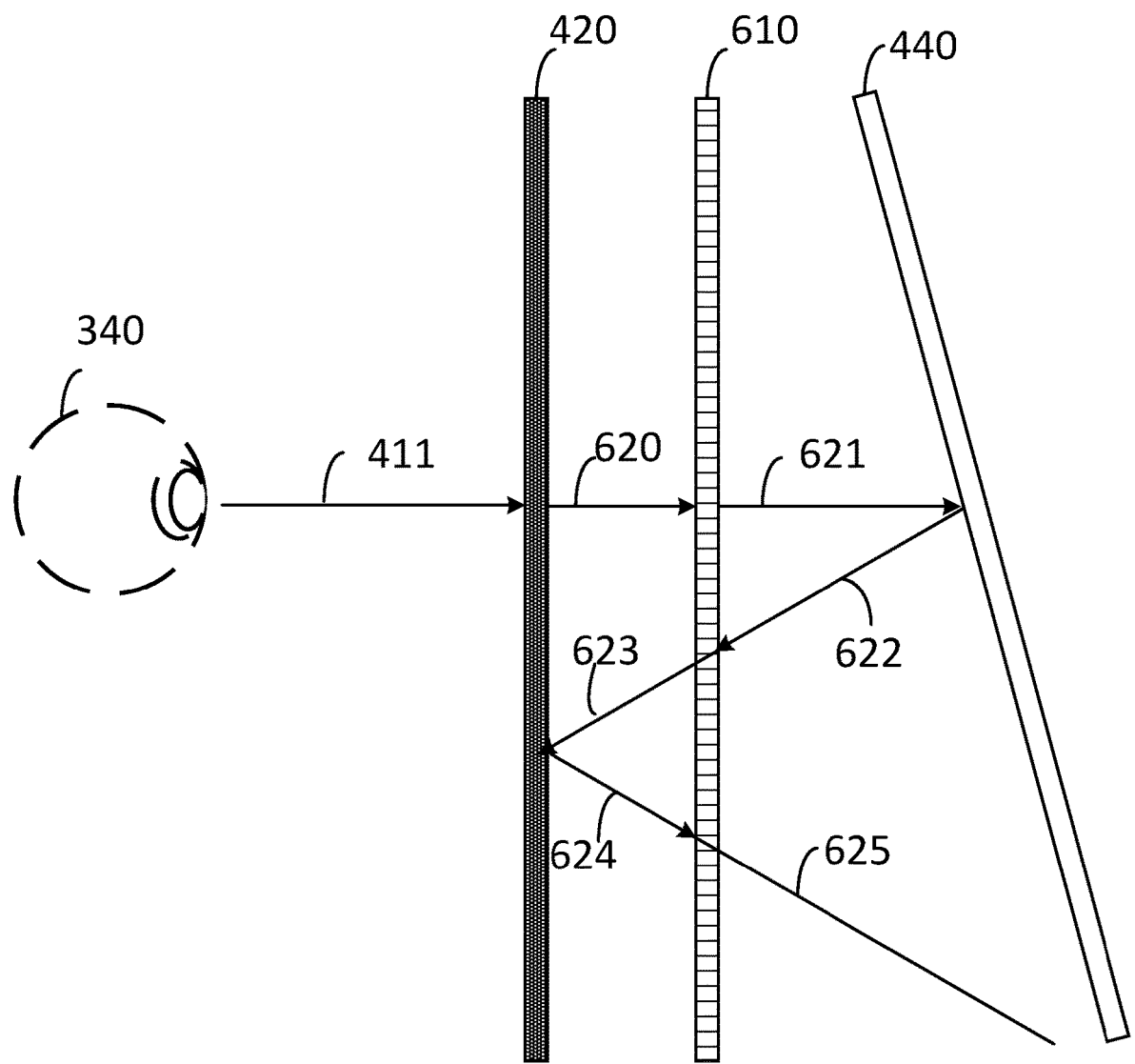
FIG. 6 illustrates a schematic diagram of a head-mounted display device using polarization in accordance with some embodiments.

FIG. 6 illustrates a schematic diagram of a head-mounted display device using polarization accordance with some embodiments.

The head-mounted display device is similar to the head-mounted display devices illustrated in FIG. 4 and FIG. 5A, except for a first mirror 420 and a wave plate 610. As shown in FIG. 6, the head-mounted display device includes the first mirror 420, the wave plate 610, and the second mirror 440. In some embodiments, the wave plate 610 is located between a first mirror 420 and the second mirror 440. In some embodiments, the first mirror 420 is a wavelength selective reflective linear polarizer that is configured to linearly polarize the infrared light reflected from an eye 340. In some embodiments, the first mirror 420 has a polarizing axis that allows light having a direction parallel to the polarizing axis to pass through the first mirror 420. In some embodiments, the wave plate 610 is a quarter wave plate that transform the linearly polarized light transmitted through the first mirror 420 to circularly polarized light. In some embodiments, the circularly polarized light is defined as left-circularly polarized light or right-circularly polarized light according to a direction of rotation of electric field vectors with respect to a direction of propagation of the circularly polarized light. For illustration purposes, the first mirror 420 and the wave plate 610 are spaced apart from each other by a particular distance. In some embodiments, the first mirror 420 is disposed very close to the wave plate 610 so that the first mirror 420 and the wave plate 610 are able to restrict or control a direction of infrared light 411 reflected from an eye 340 for circular polarization. For brevity, the detailed descriptions of components of the head-mounted display device as described above with respect to FIG. 4 and FIG. 5A are not repeated herein.

As shown in FIG. 6, when the infrared light 411 reflected from an eye 340 reaches the first mirror 420, the first mirror 420 is configured to linearly polarize the infrared light 411. In some embodiments, the wave plate 610 is configured to turn linearly polarized light into circularly polarized light by adjusting a plane of the linearly polarized light at ±45° to an optical axis of the wave plate 610 that is parallel to a surface of the wave plate 610. In some embodiments, the linearly polarized light 620 is incident on the wave plate 610 at a first incident angle (e.g., 0°), and the wave plate 610 is configured to convert the linearly polarized light 620 to circularly polarized light 621 (e.g., left-circularly polarized light) and transmit the circularly polarized light 621 toward the second mirror 440. The circularly polarized light 621 reaches the second mirror 440 at a second incident angle (e.g., 15°) and the second mirror 440 reflects the circularly polarized light 622 toward the wave plate 610 at a first reflection angle (e.g., 15°). In some embodiments, the second incident angle is greater than the first incident angle. When the circularly polarized light 622 is reflected by the second mirror 440, a direction in which the electric field vector of the circularly polarized light rotates is reversed. Thus, the circularly polarized light 622 transmitted toward the wave plate 610 has a direction of rotation (e.g., right-circularly polarized light) opposite to the circularly polarized light 621 (e.g., left-circularly polarized light). As the circularly polarized light 622 passes through the wave plate 610, the wave plate 610 converts the circularly polarized light 622 to linearly polarized light 623 without changing the direction of rotation of the electric field vector and transmit the linearly polarized light 623 toward the first mirror 420. In some embodiments, the linearly polarized light 623 is oriented 90° from the polarizing axis of the first mirror 420 so that the first mirror 420 reflects the linearly polarized light 624, which is received at a third incident angle (e.g., 30°), toward the wave plate 610 at a second reflection angle (e.g., 30°). In some embodiments, the third incident angle is greater than the first incident angle and the second incident angle. The second reflection angle is greater than the first incident angle. In some embodiments, the wave plate further converts the linearly polarized light 624 into circularly polarized light 625 and transmit the circularly polarized light 625 toward the second mirror 440. In some embodiments, the circularly polarized light 625 has a same direction of circular polarization (e.g., right-circularly polarized light) as the circularly polarized light 622. In some embodiments, one or more sensors (e.g., the one or more sensors 460 illustrated in FIG. 4) are configured to detect circularly polarized light (e.g., the circularly polarized light 625) reflected by either the first mirror 420 or the second mirror 440 after two or more reflections of the infrared light 411 occurs in the first mirror 420 and the second mirror 440.

As two or more reflections of infrared light in the first mirror 420 and the second mirror 440 continue, the infrared light reflected by the second mirror 440 and transmitted through the wave plate 610 may transmit through the first mirror 420 before the one or more sensors (the one or more sensors 460) detect the infrared light. For example, the second mirror 440 is configured to reflect the circularly polarized light at a third reflection angle (e.g., 45°) toward the wave plate 610. The circularly polarized light has a direction of circular polarization (e.g., left-circularly polarized light) opposite to the circularly polarized light 625 (e.g., right-circularly polarized light). The wave plate 610 is configured to convert the circularly polarized light to linearly polarized light and transmit the linearly polarized light toward the first mirror 420. The linearly polarized light reaches the first mirror 420 at a fourth incident angle that is greater than the first incident angle, the second incident angle and the third incident angle. The first mirror 420 transmits a portion of the linearly polarized light transmitted through the wave plate 610 while reflecting the linearly polarized light at a fourth reflection angle that is greater than the first reflection angle, the second reflection angle, and the third reflection angle.

Figure 7:
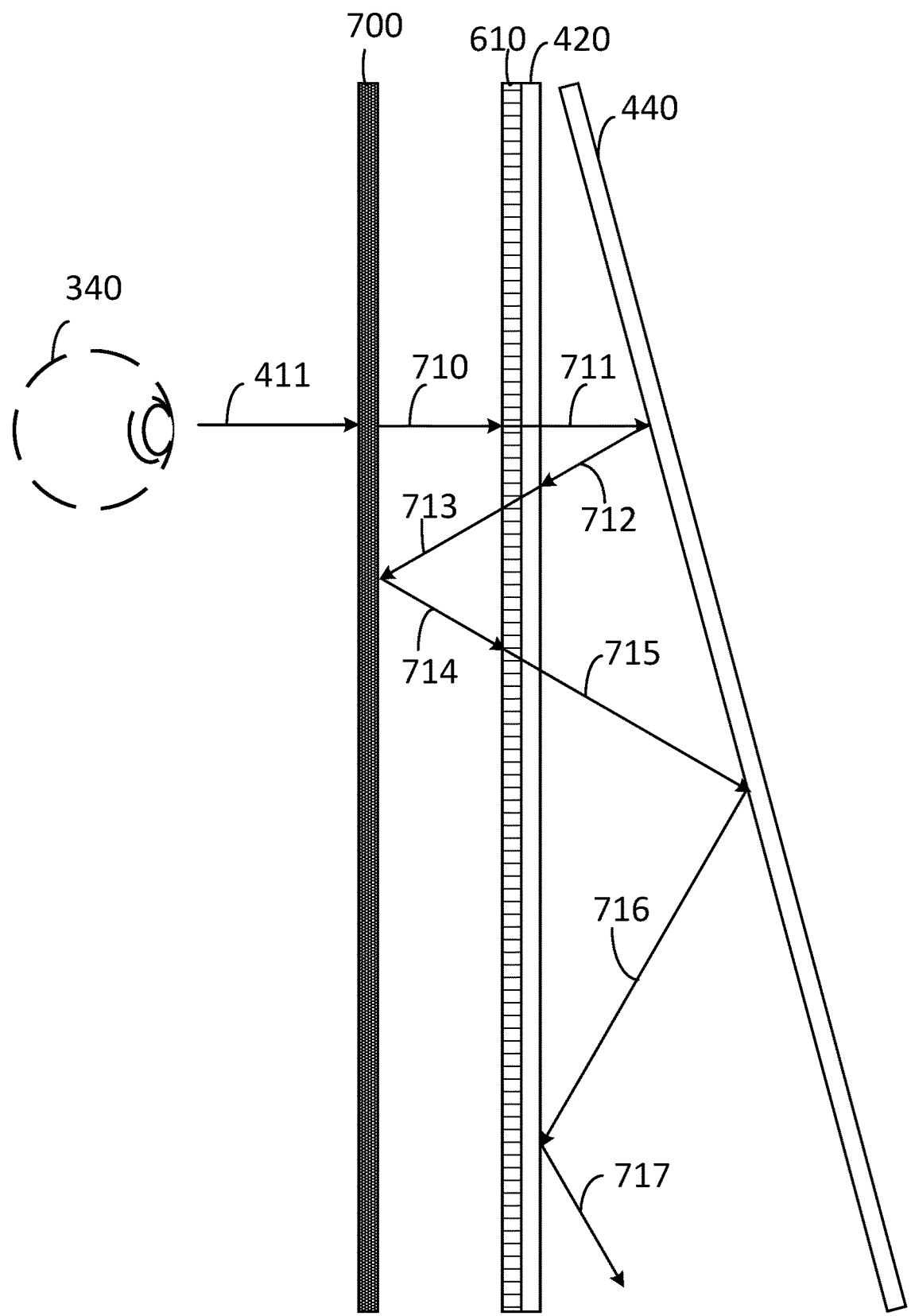
FIG. 7 illustrates a schematic diagram of a head-mounted display device in accordance with some embodiments.

To prevent the portion of the linearly polarized light from passing through the first mirror 420, the first mirror 420, which is located between the wave plate 610 and the second mirror 440, and a linear polarizer, which is located in front of the wave plate 610, are used. FIG. 7 illustrates a schematic diagram of a head-mounted display device in accordance with some embodiments.

The head-mounted display device in FIG. 7 is similar to the head-mounted display device illustrated in FIG. 4 and FIG. 6, except for a polarizer 700 and a first mirror 420. As shown in FIG. 7, the linear polarizer 700 is located in front of a wave plate 610, and the first mirror 420 is located between the wave plate 610 and the second mirror 440. The linear polarizer 700 is configured to have a similar function as the first mirror 420 as described above with respect to FIG. 6. In some embodiments, the first mirror 420 is configured to transmit visible light at any incident angle between 0°-90° and reflect infrared light that is incident on the first mirror 420 at a minimum incident angle (e.g., 45°), or greater, that is relatively greater than the minimum incident angle (e.g., 22.5°) as described above with respect to FIG. 5A-5B. For brevity, the detailed descriptions of components of the head-mounted display device as described above with respect to FIG. 4 and FIG. 6 are not repeated herein.

As shown in FIG. 7, the infrared light 411 reflected from an eye 340 reaches the linear polarizer 700. The linear polarizer 700 is configured to linearly polarize the infrared light 411 and transmit the linearly polarized light 710 toward the wave plate 610. The wave plate 610 is configured to convert the linearly polarized infrared light 710 to circularly polarized light 711 (e.g., left-circularly polarized light) and transmit the circularly polarized light 711 toward the first mirror 420. The circularly polarized light 711 reaches the first mirror 420 at a first incident angle (e.g., 0 (zero)°), that is less than the minimum incident angle as described above, so that the first mirror 420 transmits the circularly polarized light 711 toward the second mirror 440. In some embodiments, the second mirror is inclined at a particular incline angle (e.g., 5°, 10°, 15°, etc.) from an optical axis of one or more lenses (e.g., the one or more lenses 480) of the head-mounted display. Due to the particular incline angle of the second mirror 440, the circularly polarized light 711 reaches the second mirror 440 at a second incident angle (e.g., 5°, 10°, 15°, etc.), which is equal to the particular incline angle of the second mirror 440. In some embodiments, the second mirror 440 is configured to reflect infrared light incident on the second mirror 440 at any incident angle. The second mirror 440 is configured to reflect the circularly polarized light 712 at a first reflection angle (e.g., 15°) toward the first mirror 420. Due to the reflection, the circularly polarized light 712 has a direction of circular polarization (e.g., right-circularly polarized light) opposite to the circularly polarized light 711 (e.g., left-circularly polarized light). The circularly polarized light 712 is incident on the first mirror 420 at a second incident angle (e.g., 30°), which is less than the minimum incident angle (e.g., 45°), so that the first mirror 420 transmits the circularly polarized light 712 toward the wave plate 610. In some embodiments, the second incident angle is greater than the first incident angle. The wave plate 610 is configured to turn the circularly polarized light 712 to linearly polarized light 713. The linearly polarized light 713 is incident on the linear polarizer 700 at a third incident angle (e.g., 30°) that is greater than the first incident angle and the second incident angle. The linear polarizer 700 is configured to reflect linearly polarized light 714 at a second reflection angle (e.g., 30°), which is greater than the first reflection angle, toward the wave plate 610. The wave plate 610 is configured to convert the linearly polarized light 714 to circularly polarized light 715 and transmit the circularly polarized light 715 toward the second mirror 440. The circularly polarized light 715 reaches the second mirror 440 at a fourth incident angle (e.g., 45°), which is greater than the first incident angle, the second incident angle and the third incident angle. The second mirror 440 is configured to reflect the circularly polarized light 716 at a third reflection angle (e.g., 45°), which is greater than the first reflection angle and the second reflection angle, toward the first mirror 420. The circularly polarized light 716 has a direction of circular rotation (e.g., left—circularly polarized light) opposite to the circularly polarized light 715. The circularly polarized light 716 reaches the first mirror 420 at a fifth incident angle (e.g., 60°), which is greater than the minimum incident angle, so that the first mirror 420 is configured to reflect the circularly polarized light 717 at a fourth reflection angle (e.g., 60°).

One or more sensors (e.g., the one or more sensors 460 illustrated in FIG. 4) are configured to detect circularly polarized light (e.g., the circularly polarized light 717) after two or more reflections of the infrared light 411 occurs in the first mirror 420 and the second mirror 440.

Figure 8:
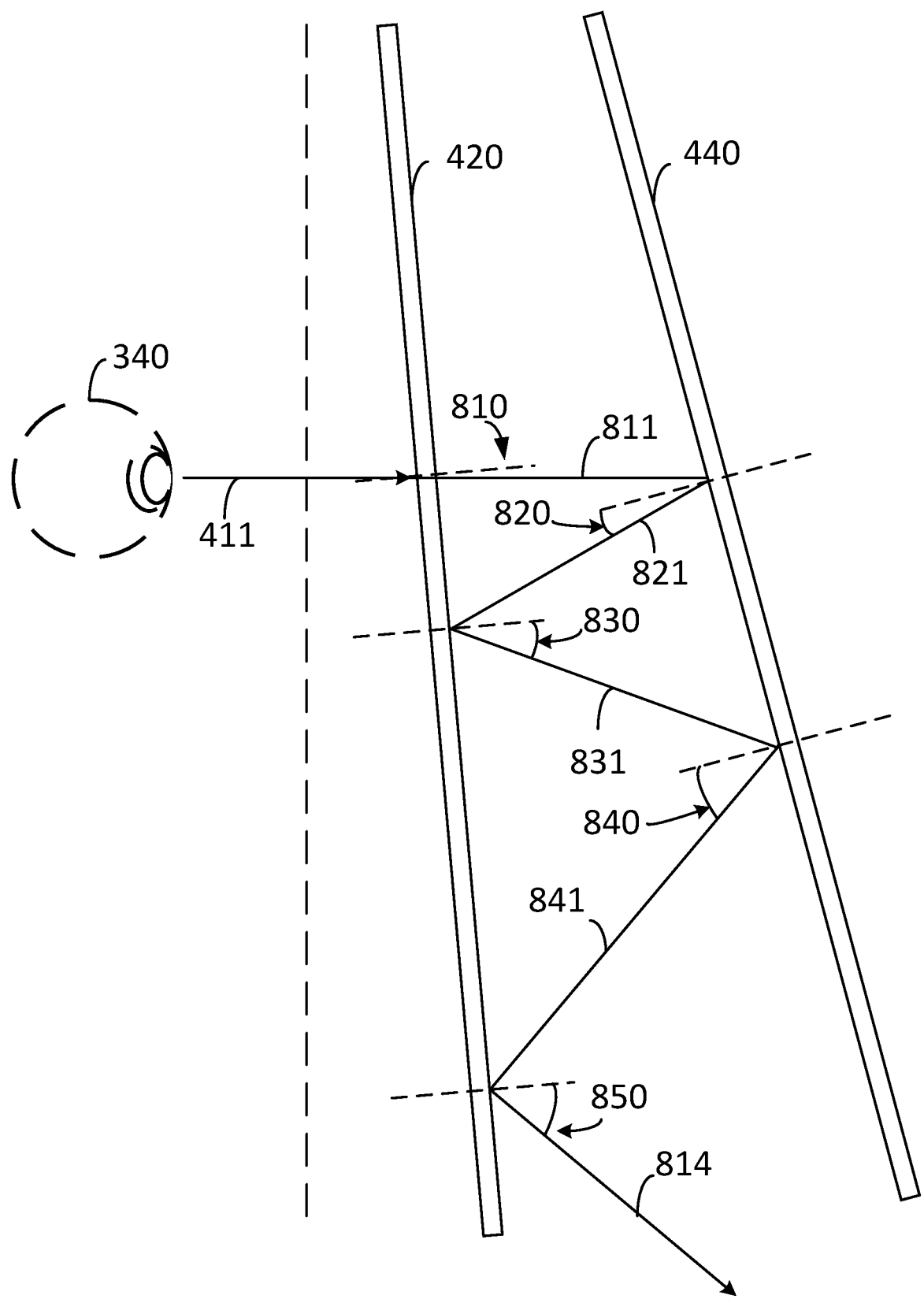
FIG. 8 illustrates a schematic diagram of a head-mounted display device having a first mirror inclined at a particular incline angle from an optical axis of one or more lenses in accordance with some embodiments.

FIG. 8 illustrates a schematic diagram of a head-mounted display device having a first mirror inclined at a particular incline angle from an optical axis of one or more lenses in accordance with some embodiments.

The head-mounted display device is similar to the head-mounted display device illustrated in FIGS. 4-5A, except for the first mirror 420, which is inclined at a particular incline angle from an optical axis of one or more lenses (e.g., one or more lenses 480) of the head-mounted display. For brevity, the detailed descriptions of components of the head-mounted display device as described above with respect to FIGS. 4-5A are not repeated herein.

In some embodiments, the first mirror 420 is inclined at a first incline angle (e.g., 10°) from the optical axis of the one or more lenses and the second mirror 440 is inclined at a second incline angle (e.g., 15°) from the optical axis of the one or more lenses, thereby reducing space between the first mirror 420 and the second mirror, and allowing more space for other components in the head-mounted display device. In some embodiments, the second incline angle is greater than the first incline angle. In some embodiments, the first mirror 420 is configured to reflect infrared light incident on the first mirror 420 at an incident angle that is greater than a minimum incident angle that allows the first mirror 420 to reflect infrared light incident on the first mirror 420. In some embodiments, the minimum incident angle is calculated as a sum of the second incline angle of the second mirror 440 and a value calculated by subtracting the first incline angle from the second incline angle. For example, the first mirror 420 is inclined at 10° and the second mirror 440 is inclined at 15°, so that the minimum incident angle of the first mirror 420 is a sum of 15° (the second incline angle) and 5° (the second incline angle–the first incline angle)).

As shown in FIG. 8, the infrared light 411 reflected from an eye 340 reaches the first mirror 420. The first mirror 420 is configured to transmit the infrared light 411 incident on the first mirror 420 at a first incident angle, which is equal to the first incident angle (e.g., 5°) of the first mirror 420, toward the second mirror 440. In some embodiments, the first incident angle is less than the calculated minimum incident angle (e.g., 20°), so that the first mirror 420 transmits the infrared light 811 toward the second mirror 440. The infrared light 811 reaches the second mirror 440 at a second incident angle (e.g., 15°) that is greater than the first incident angle. In some embodiments, the second incident angle is equal to the second incline angle. In some embodiments, the second mirror 440 is configured to reflect infrared light 821 at a first reflection angle 820 (e.g., 15°) toward the first mirror 420. The infrared light 821 reaches the first mirror 420 at a third incident angle (e.g., 25°), which is greater than the calculated value (e.g., 20°) for reflection of the first mirror 420, so that the first mirror 420 is configured to reflect infrared light 831 at a second reflection angle 830 (e.g., 25°), which is greater than the first reflection angle 820, toward the second mirror 440. The infrared light 831 reaches the second mirror 440 at a fourth incident angle (e.g., 35°), which is greater than the first incident angle, the second incident angle and the third incident angle. In some embodiments, the second mirror 440 reflects infrared light 841 at a third reflection angle 840 (e.g., 35°) that is greater than the first reflection angle and the second reflection angle. In some embodiments, the infrared light 841 reaches the first mirror 420 at a fifth incident angle (e.g., 45°), which is greater than the first incident angle, the second incident angle, the third incident angle, and the fourth incident angle. The fifth incident angle is greater than the calculated minimum incident angle (e.g., 20°), so that the first mirror 420 reflects the infrared light 814 at a fourth reflection angle 850 (e.g., 45°) that is greater than the first reflection angle, the second reflection angle, and the third reflection angle.

In some embodiments, a reflection angle of nth reflection can be represented in the following equation (1).

$$\theta + (n-1)\alpha \qquad (1)$$

θ represents the second incline angle of the second mirror 440, and n represents a number of reflections. α represents a value calculated by subtracting the first incline angle of the first mirror 420 from the second incline angle of the second mirror 440. Two or more reflections of the infrared light 411 continue until one or more sensors (e.g., the one or more sensors 460) detect infrared light reflected by either the first mirror 420 or the second mirror 440 as described above with respect to FIGS. 4-7.

FIG. 9 is a flow diagram illustrating a method 900 of making a display device in accordance with some embodiments.

The method includes emitting (902) infrared light from one or more infrared light sources (e.g., the one or more infrared light sources 400 illustrated in FIG. 4) toward one or more eyes of a wearer (e.g., the eye 340). The method further includes transmitting (904) an infrared light (e.g., the infrared light 411), reflected from the one or more eyes of the wearer toward a first mirror (e.g., the first mirror 420) and received by the first mirror at a first incident angle, through the first mirror and reflecting an infrared light (e.g., the infrared light 411), reflected from the one or more eyes of the wearer toward the first mirror and received by the first mirror, at a second incident angle. The second incident angle is greater than the first incident angle as described with respect to FIG. 4. The method further includes reflecting (906) the infrared light transmitted through the first mirror (e.g., the infrared light 412, the infrared light 512, the circularly polarized light 711, the infrared light 811) by a second mirror (e.g., the second mirror 440) that is inclined at a first incline angle (e.g., 5°, 10°, 15°, 22.5°, 45°, etc.) from an optical axis of one or more lenses (e.g., the one or more lenses 480) coupled with one or more displays of a head-mounted display device, at a first reflection angle as described above with respect to FIGS. 4-8. The method further includes reflecting (908) the infrared light, reflected by the second mirror toward the first mirror (e.g., the infrared light 414, the infrared light 514, the circularly polarized light 717, the infrared light 821) by the first mirror at a second reflection angle that is greater than the first reflection angle as described above with respect to FIGS. 4-8. The method further includes detecting (910) with one or more sensors (e.g., the one or more sensors 460), the infrared light reflected by the first mirror and the second mirror for determining a gaze direction of the one or more eyes of the wearer.

In light of these principles, we turn to certain embodiments.

In accordance with some embodiments, a head-mounted display device includes one or more infrared light sources configured to emit infrared light toward one or more eyes of a wearer, a first mirror configured to transmit an infrared light, reflected from the one or more eyes of the wearer toward the first mirror and received by the first mirror at a first incident angle, the first mirror configured to reflect an infrared light, reflected from the one or more eyes of the wearer toward the first mirror and received by the first mirror at a second incident angle that is greater than the first incident angle (e.g., FIGS. 4-8). The head-mounted display device includes a second mirror coupled with the first mirror, the second mirror configured to reflect the infrared light transmitted through the first mirror toward the first mirror, one or more displays configured to provide visible light toward the second mirror (e.g., FIGS. 4-8). The second mirror and the first mirror are configured to transmit the visible light from the one or more displays (e.g., FIGS. 4-8). The head-mounted display device further includes one or more lenses configured to transmit the visible light from the one or more displays toward the one or more eyes of the wearer and one or more sensors configured to detect the infrared light reflected by the first mirror and the second mirror for determining a gaze direction of the one or more eyes of the wearer (e.g., FIGS. 4-8). The second mirror is inclined at a first incline angle from an optical axis of the one or more lenses so that the infrared light transmitted through the first mirror is reflected by the second mirror toward the first mirror at a first reflection angle, and the infrared light reflected by the second mirror is reflected by the first mirror toward the second mirror at a second reflection angle that is greater than the first reflection angle (e.g., FIGS. 4-8).

In some embodiments, a first end of the first mirror has a first distance to a first end of the second mirror that is adjacent to the first end of the first mirror, and a second end of the first mirror, opposite to the first end of the first mirror has a second distance to a second end of the second mirror that is opposite to the first end of the second mirror and is adjacent to the second end of the first mirror so that the reflected infrared light is directed toward a region that includes the second end of the second mirror and the second end of the first mirror and away from a region that includes the first end of the second mirror and the first end of the first mirror (e.g., FIGS. 4-8).

In some embodiments, the one or more sensors are located adjacent to the region that includes the second end of the second mirror and the second end of the first mirror for detecting the infrared light reflected by the first mirror and the second mirror (e.g., FIGS. 4-8).

In some embodiments, the first mirror is inclined at a second incline angle from the optical axis of the one or more lenses that is less than the first incline angle of the second mirror (e.g., FIGS. 4-8).

In some embodiments, the second incline angle of the first mirror allows the first mirror to transmit an infrared light received at the second incline angle and reflect an infrared light received at an incident angle that is greater than the second incline angle (e.g., FIGS. 4-8).

In some embodiments, the second mirror is configured to reflect the infrared light, reflected by the first mirror, toward the first mirror at a third reflection angle that is greater than the second reflection angle and the first mirror is configured to reflect the infrared light, reflected by the second mirror, at a fourth reflection angle that is greater than the third reflection angle (e.g., FIGS. 4-8).

In some embodiments, a wave plate located between the first mirror and the second mirror. The first mirror is a reflective linear polarizer, the first mirror configured to transmit an infrared light having a first linear polarization and reflect an infrared light having a second linear polarization that is distinct from the first linear polarization (e.g., FIG. 6).

In some embodiments, the head-mounted display device includes a reflective linear polarizer and a wave plate located between the reflective linear polarizer and the first mirror (e.g., FIG. 7). The first mirror is located between the wave plate and the second mirror and the reflective linear polarizer is configured to transmit an infrared light having a first linear polarization and reflect an infrared light having a second linear polarization that is distinct from the first linear polarization (e.g., FIG. -7).

In some embodiments, the wave plate is a quarter wave plate (e.g., FIGS. 6-7). In some embodiments, the second mirror is configured to reflect an infrared light having any angle of incidence on the second mirror (e.g., FIGS. 4-8).

In accordance with some embodiments, a method for providing contents to a wearer of a head-mounted display device includes emitting infrared light from one or more infrared light sources toward one or more eyes of a wearer, transmitting an infrared light, reflected from the one or more eyes of the wearer toward a first mirror and received by the first mirror at a first incident angle, through the first mirror and reflecting an infrared light, reflected from the one or more eyes of the wearer toward the first mirror and received by the first mirror at a second incident angle (e.g., FIGS. 4-8). The second incident angle is greater than the first incident angle (e.g., FIGS. 4-8). The method further includes reflecting the infrared light transmitted through the first mirror, with a second mirror that is inclined at a first incline angle from an optical axis of one or more lenses coupled with one or more displays of the head-mounted display device, at a first reflection angle and reflecting the infrared light, reflected by the second mirror toward the first mirror, with the first mirror at a second reflection angle that is greater than the first reflection angle (e.g., FIGS. 4-8). The method further includes detecting, with one or more sensors, the infrared light reflected by the first mirror and the second mirror for determining a gaze direction of the one or more eyes of the wearer (e.g., FIGS. 4-8).

In some embodiments, a first end of the first mirror has a first distance to a first end of the second mirror that is adjacent to the first end of the first mirror, and a second end of the first mirror, opposite to the first end of the first mirror has a second distance to a second end of the second mirror that is opposite to the first end of the second mirror and is adjacent to the second end of the first mirror so that the reflected infrared light is directed toward a region that includes the second end of the second mirror and the second end of the first mirror and away from a region that includes the first end of the second mirror and the first end of the first mirror (e.g., FIGS. 4-8).

In some embodiments, the one or more sensors are located adjacent to the region that includes the second end of the second mirror and the second end of the first mirror for detecting the infrared light reflected by the first mirror and the second mirror (e.g., FIGS. 4-8).

In some embodiments, the first mirror is inclined at a second incline angle from the optical axis of the one or more lenses that is less than the first incline angle of the second mirror (e.g., FIGS. 4-8).

In some embodiments, the second incline angle of the first mirror allows the first mirror to transmit an infrared light received at the second incident angle and reflect the infrared light received at an incident angle that is greater than the second incline angle (e.g., FIGS. 4-8).

In some embodiments, the method further includes reflecting the infrared light reflected by the first mirror, with the second mirror, at a third reflection angle that is greater than the second reflection angle and reflecting the infrared light reflected by the second mirror, with the first mirror, at a fourth reflection angle that is greater than the third reflection angle (e.g., FIGS. 4-8).

In some embodiments, the method further includes transmitting an infrared light having a first linear polarization through the first mirror toward a wave plate located between the first mirror and the second mirror (e.g., FIGS. 4-6, and 8). The first mirror is a reflective linear polarizer and reflecting an infrared light having a second linear polarization with the first mirror, wherein the second linear polarization is distinct from the first linear polarization (e.g., FIG. 6).

In some embodiments, the method further includes transmitting an infrared light having a first linear polarization through a reflective linear polarizer toward a wave plate located between a reflective linear polarizer and the first mirror (e.g., FIG. 7). The first mirror is located between the wave plate and the second mirror (e.g., FIG. 7). The method further includes reflecting an infrared light having a second linear polarization with the reflective linear polarizer (e.g., FIG. 7). The second linear polarization is distinct from the first linear polarization (e.g., FIGS. 6-7).

In some embodiments, the wave plate is a quarter wave plate (e.g., FIGS. 6-7). The method further includes reflecting, with the second mirror, an infrared light having any angle of incidence on the second mirror (e.g., FIGS. 4-8).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A head-mounted display device, the device comprising:
   one or more infrared light sources configured to emit infrared light toward one or more eyes of a wearer;
   a first mirror configured to transmit an infrared light, reflected from the one or more eyes of the wearer toward the first mirror and received by the first mirror at a first incident angle, the first mirror configured to reflect an infrared light, reflected from the one or more eyes of the wearer toward the first mirror and received by the first mirror at a second incident angle that is greater than the first incident angle;
   a second mirror coupled with the first mirror, the second mirror configured to reflect the infrared light transmitted through the first mirror toward the first mirror;
   one or more displays configured to provide visible light toward the second mirror, wherein the second mirror and the first mirror are configured to transmit the visible light from the one or more displays;
   one or more lenses configured to transmit the visible light from the one or more displays toward the one or more eyes of the wearer; and
   one or more sensors configured to detect the infrared light reflected by the first mirror and the second mirror for determining a gaze direction of the one or more eyes of the wearer, wherein:
      the second mirror is inclined at a first incline angle from an optical axis of the one or more lenses so that the infrared light transmitted through the first mirror is reflected by the second mirror toward the first mirror at a first reflection angle, and the infrared light reflected by the second mirror is reflected by the first mirror toward the second mirror at a second reflection angle that is greater than the first reflection angle.

2. The device of claim 1, wherein a first end of the first mirror has a first distance to a first end of the second mirror that is adjacent to the first end of the first mirror, and a second end of the first mirror, opposite to the first end of the first mirror has a second distance to a second end of the second mirror that is opposite to the first end of the second mirror and is adjacent to the second end of the first mirror so that the reflected infrared light is directed toward a region that includes the second end of the second mirror and the second end of the first mirror and away from a region that includes the first end of the second mirror and the first end of the first mirror.

3. The device of claim 2, wherein the one or more sensors are located adjacent to the region that includes the second end of the second mirror and the second end of the first mirror for detecting the infrared light reflected by the first mirror and the second mirror.

4. The device of claim 1, wherein the first mirror is inclined at a second incline angle from the optical axis of the one or more lenses that is less than the first incline angle of the second mirror.

5. The device of claim 4, wherein the second incline angle of the first mirror allows the first mirror to transmit an infrared light received at the second incline angle and reflect an infrared light received at an incident angle that is greater than the second incline angle.

6. The device of claim 5, wherein:
   the second mirror is configured to reflect the infrared light, reflected by the first mirror, toward the first mirror at a third reflection angle that is greater than the second reflection angle; and
   the first mirror is configured to reflect the infrared light, reflected by the second mirror, at a fourth reflection angle that is greater than the third reflection angle.

7. The device of claim 1, further comprising:
   a wave plate located between the first mirror and the second mirror, wherein:
      the first mirror is a reflective linear polarizer, the first mirror configured to transmit an infrared light having a first linear polarization and reflect an infrared light having a second linear polarization that is distinct from the first linear polarization.

8. The device of claim 1, further comprising:
   a reflective linear polarizer; and
   a wave plate located between the reflective linear polarizer and the first mirror, wherein:
      the first mirror is located between the wave plate and the second mirror; and
      the reflective linear polarizer is configured to transmit an infrared light having a first linear polarization and reflect an infrared light having a second linear polarization that is distinct from the first linear polarization.

9. The device of claim 8, wherein:
   the wave plate is a quarter wave plate.

10. The device of claim 1, wherein:
    the second mirror is configured to reflect an infrared light having any angle of incidence on the second mirror.

11. A method for providing contents to a wearer of a head-mounted display device, the method comprising:
    emitting infrared light from one or more infrared light sources toward one or more eyes of a wearer;

transmitting an infrared light, reflected from the one or more eyes of the wearer toward a first mirror and received by the first mirror at a first incident angle, through the first mirror and reflecting an infrared light, reflected from the one or more eyes of the wearer toward the first mirror and received by the first mirror at a second incident angle, wherein the second incident angle is greater than the first incident angle;
reflecting the infrared light transmitted through the first mirror, with a second mirror that is inclined at a first incline angle from an optical axis of one or more lenses coupled with one or more displays of the head-mounted display device, at a first reflection angle;
reflecting the infrared light, reflected by the second mirror toward the first mirror, with the first mirror at a second reflection angle that is greater than the first reflection angle; and
detecting, with one or more sensors, the infrared light reflected by the first mirror and the second mirror for determining a gaze direction of the one or more eyes of the wearer.

12. The method of claim 11, wherein a first end of the first mirror has a first distance to a first end of the second mirror that is adjacent to the first end of the first mirror, and a second end of the first mirror, opposite to the first end of the first mirror has a second distance to a second end of the second mirror that is opposite to the first end of the second mirror and is adjacent to the second end of the first mirror so that the reflected infrared light is directed toward a region that includes the second end of the second mirror and the second end of the first mirror and away from a region that includes the first end of the second mirror and the first end of the first mirror.

13. The method of claim 12, wherein the one or more sensors are located adjacent to the region that includes the second end of the second mirror and the second end of the first mirror for detecting the infrared light reflected by the first mirror and the second mirror.

14. The method of claim 11, wherein the first mirror is inclined at a second incline angle from the optical axis of the one or more lenses that is less than the first incline angle of the second mirror.

15. The method of claim 14, wherein the second incline angle of the first mirror allows the first mirror to transmit an infrared light received at the second incident angle and reflect the infrared light received at an incident angle that is greater than the second incline angle.

16. The method of claim 15, further comprising:
reflecting the infrared light reflected by the first mirror, with the second mirror, at a third reflection angle that is greater than the second reflection angle; and
reflecting the infrared light reflected by the second mirror, with the first mirror, at a fourth reflection angle that is greater than the third reflection angle.

17. The method of claim 11, further comprising:
transmitting an infrared light having a first linear polarization through the first mirror toward a wave plate located between the first mirror and the second mirror, wherein the first mirror is a reflective linear polarizer; and
reflecting an infrared light having a second linear polarization with the first mirror, wherein the second linear polarization is distinct from the first linear polarization.

18. The method of claim 11, further comprising:
transmitting an infrared light having a first linear polarization through a reflective linear polarizer toward a wave plate located between a reflective linear polarizer and the first mirror, wherein the first mirror is located between the wave plate and the second mirror; and
reflecting an infrared light having a second linear polarization with the reflective linear polarizer, wherein the second linear polarization is distinct from the first linear polarization.

19. The method of claim 18, wherein:
the wave plate is a quarter wave plate.

20. The method of claim 11, including:
reflecting, with the second mirror, an infrared light having any angle of incidence on the second mirror.

* * * * *